United States Patent
Bogdanov

(10) Patent No.: US 9,361,266 B2
(45) Date of Patent: Jun. 7, 2016

(54) SYSTEM AND METHOD FOR DISTRIBUTED COMPUTING

(75) Inventor: Alexander Yakovlevich Bogdanov, Moscow (RU)

(73) Assignee: Alexander Yakovlevich Bogdanov, Moscow (RU)

( * ) Notice: Subject to any disclaimer, the term of this patent is extended or adjusted under 35 U.S.C. 154(b) by 301 days.

(21) Appl. No.: 13/877,912

(22) PCT Filed: Oct. 4, 2011

(86) PCT No.: PCT/RU2011/000776
§ 371 (c)(1),
(2), (4) Date: Apr. 5, 2013

(87) PCT Pub. No.: WO2012/047134
PCT Pub. Date: Apr. 12, 2012

(65) Prior Publication Data
US 2013/0326191 A1    Dec. 5, 2013

(30) Foreign Application Priority Data

Oct. 6, 2010   (RU) ............................... 2010140853

(51) Int. Cl.
G06F 3/00       (2006.01)
G06F 9/44       (2006.01)
G06F 9/46       (2006.01)
G06F 13/00      (2006.01)
G06F 15/76      (2006.01)
G06F 9/54       (2006.01)

(52) U.S. Cl.
CPC ................ G06F 15/76 (2013.01); G06F 9/547 (2013.01)

(58) Field of Classification Search
None
See application file for complete search history.

(56) References Cited

U.S. PATENT DOCUMENTS

| | | | |
|---|---|---|---|
| 5,522,070 A * | 5/1996 | Sumimoto | 718/104 |
| 5,603,031 A | 2/1997 | White et al. | |
| 5,896,524 A * | 4/1999 | Halstead et al. | 713/375 |
| 6,694,370 B1 | 2/2004 | Bischof et al. | |
| 7,412,581 B2 * | 8/2008 | Morita et al. | 711/167 |
| 7,788,314 B2 | 8/2010 | Holt | |
| 2003/0084098 A1 * | 5/2003 | Lavin et al. | 709/203 |
| 2005/0240737 A1 | 10/2005 | Holt | |
| 2009/0198836 A1 * | 8/2009 | Wittenschlaeger | 709/253 |

FOREIGN PATENT DOCUMENTS

RU        72339 U1    4/2008

OTHER PUBLICATIONS

"Unified Memory Space Protocol Specification", A.Bogdanov, RFC 3018, Dec. 2000, pp. 5-7.
"Unified Memory Space Protocol Specification", A.Bogdanov, Internet-Draft, draft-bogdanov-umsp-rfc3018-update-00.txt, Aug. 2003, expires Feb. 2004, pp. 9-10.

* cited by examiner

*Primary Examiner* — Craig Dorais

(57) ABSTRACT

The invention refers to tightly coupled multiprocessor distributed computing systems. The proposed solution enables to develop distributed applications as usual monolithic applications with use of typical compilers and builders. These applications support complicated logic of interaction between elements executed in different nodes and, at that, have limited complexity of development. The invention determines requirements to a distributed application and a method of its execution, memory organization and system node interaction manner.

3 Claims, 4 Drawing Sheets

SYSTEM AND METHOD FOR DISTRIBUTED COMPUTING

TECHNICAL FIELD

The invention belongs to tightly coupled multiprocessor distributed computing systems and, particularly, determines requirements to system composition, distributed application code, memory organization and sequence of operations under distributed execution of an application.

BACKGROUND OF THE INVENTION

Development of distributed applications is considerably more complicated than development of undistributed applications. Two main reasons can be distinguished. These are the following:

1) When considering an application as finite automation with specific logic of transition from one to another state, it is fair to say that a distributed application has very complicated and often unpredictable global state.

2) Development of application interaction protocol is necessary for interaction between separate nodes. Taking into account the first point, it follows that complexity of the protocol logic with acceptable operation reliability is strongly limited. It means that a distributed application functional must be rather simple. And its loss of simplicity results in nonlinear growth of development complexity.

The mentioned reasons are particularly crucial in loosely coupled distributed systems based on message exchange between independently developed component elements.

Mobile agent, a version of which is described in the patent "System and method for distributed computation based upon the movement, execution and interaction of processes in a network", U.S. Pat. No. 5,603,031, James E. White et al., Feb. 11, 1997, may be considered as one of solutions of the specified problems. This solution is based on movement of mobile code and agents with the same execution logic in different nodes. The computing model proposed in that patent is strongly limited and is mainly well-operated under single-flow distributed execution. The interaction agent model has low capacity as well. "Go" control transfer instruction proposed in the patent designates simply node in which an agent to be executed; however a start point is fixed under compilation.

Another variant of solutions of the specified problems is described in the patent "Computerised method and system for implementing distributed application", U.S. Pat. No. 6,694,370, Joerg Bischof et al., Feb. 17, 2004, which has been chosen as a prototype for the claimed invention. This solution is based on division of application instruction sequence into blocks to be executed in different network nodes. Every segment begins from an instruction allowing dynamical computing of a node into which it is necessary to move and execute a code segment next to the instruction. In the FIG. 1 it is shown a diagram of the specified prototype use. Here 11 and 12 are nodes in which distributed application is executed. 13 is a sequence of instructions downloaded in the node 11. 14 are instructions to be executed in the node 12. ASSERT instruction determines a node in which the next instruction should be executed. RELEASE instruction denotes that the next instruction can be executed in any node (in the figure it is shown that control returns to the initial node). Prototype shortcomings are the following:

1) Inconformity of a common model of program development involving dedication of code segments with specific functionality to procedures, which are located in any place of an executive file and can be called from any place of a program. Also procedures can take different parameters and return values as opposed to the concerned prototype in which this function is absent. Owing to this inconformity it is possible to use the patent-prototype only in rather simple applications.

2) A special compiler and builder supporting this technique as well as a special loader of a code for application execution are necessary for development of a program. As for interpreted applications, this technique must be supported on the level of interpreter.

3) The patent is limited within analysis of sequence of instructions to be executed in various network nodes.

SUMMARY OF THE INVENTION

The claimed invention solves the following problems:

1) A distributed application can be operated both in a single node and in many nodes. At that number and composition of nodes, in which an application is executed, can be changed during program execution process.

2) An executive file code downloaded into one of network nodes can remotely call any procedure, which is a part of this file, in any other network node. At that sequence of remote calls may be anyone and it is not necessary to develop an interaction protocol.

3) A distributed application has a predictable global state and acceptable development complexity.

4) When application is developed, a typical compiler, which does not know anything of distributed execution of an application, for example, C++ compiler and a typical builder may be used. Therefore such kind of application can be downloaded by a typical loader of an operation system or run-time environment.

The general idea of the invention is that computers turn into a distributed system for program execution if a copy of the same program is downloaded in two or more computers. Further requirements to a program code and interaction of the mentioned computers are described.

The claimed invention can be used for development of programs containing natural processor instructions, and be executed in operation system environment, or comprise intermediate code and be executed in virtual computer, or comprise interpreted instructions.

In accordance with the present invention a system can be realized by hardware or can be considered as implemented programmed virtual computer executing intermediate code or interpreted instructions.

The present invention is based on a model according to which an execution module-processor realizes program instructions placed in a memory module of this processor. Also data used by the processor during computing can be placed in the memory. A core in a multi-core processor, or a processor in a multi-processor system, or a separate computer connected to a network, or implemented programmed virtual runtime system operated by a computing unit can be a particular executing module. Also programs downloaded into the same processor in different addressing space can interact locally. At that every addressing space is considered as a separately addressed virtual processor. Invention logic is constant independently of execution module type. Different types of an execution module can interact within the bounds of execution of a single distributed application. One processor or several processors can be used. When there are several processors in a system, in the context of the claimed invention it does not matter whether each processor has its own memory module or a number of processors have a common memory module because a copy of the same program is downloaded onto every memory module. Also a method of processor interaction is not essential with regard to the invention. Means of interprocessor communication in a multi-processor system or means of network interaction, or combination of these methods can be used. The key point is possibility to identify a separate processor or a group of processors under group addressing. Processor number, its network address, some data structure or an identification unit identifying not an address, but processor functionality can be used for processor identification. Also it is possible to use a special identification unit or a special instruction pointing at that processor can be chosen randomly on the basis of current state of a system. General invention logic implies that processors should interact with each other. Nevertheless, it is possible that some connections are absent. When using absent connections, signaling through program exceptions can be used in the program. Besides, it is possible to make functional division, for example, a division into clients and a server. At that a client can call server procedures but client's call of procedures can be limited or prohibited by a server for reasons of safety.

The main specific feature of a distributed application described in the invention is presence of one explicit or implicit additional parameter in control transfer instructions. A typical control transfer instruction, such as, an instruction of conditional or unconditional transfer, an instruction of transfer with return, an instruction of procedure call comprises one obligatory parameter—direct or indirect pointer at the next instruction to be executed (unconditionally or under certain conditions). When high-level language is used, this parameter is usually a mark or a name of a procedure for which a builder can compute a relative address located either in a resultant executive file or in a certain table placed in the file. When executing a program, physical address of this instruction can be computed through offset made from the beginning of the executed file. Alternatively it can be taken from a table usually located in a certain place of the file. At that, data, on the basis of which a physical address is computed, are the same in all the nodes in which an application copy is downloaded. Thus, when one more parameter, such as, address or identification unit of a processor, by means of which an instruction to be executed, is added into a control transfer instruction, distributed execution of an application can be organized. To fulfill this process it is necessary that processor interaction logic solves the following tasks:

1) To take control transfer instruction parameters from one processor and to transfer them to a control processor-recipient.

2) To actuate execution of computing flow from the certain instruction in a control processor-recipient.

Generally, processor address in such control transfer instruction can be absent in an explicit form. At that the instruction implies that processor address should be computed on the basis of a current state of a system or additional call parameters.

Processors can exchange data through common memory and/or through message exchange dependently on specific architecture. As a remote call and procedure execution is realized by the same program, it is not necessary for conformance of formats of a call and a returned value. It is possible to transfer a message which contains a relative address of instruction, with binary copy of stack frame. Alternatively an application can use its message packing algorithm which is commonly unique for this application. At that message packing and unpacking can be realized by means of a code of the application. There is the same process when transfer of parameters is made through stack under local calls.

Usually a code of procedure is made such as that the procedure can be called from any place of a program. Control flow execution context is not particular for this procedure; however there are exceptions (for example, for transfer instructions). To take these exceptions into account, processors should exchange not only call parameters but also execution context.

The FIG. 2 shows procedure call instruction execution in accordance with the claimed invention (instruction has not parameters and a returned valued in order to simplify description). A distributed application is executed in two nodes. Here 21 and 22 are nodes in which an application is executed. 23 and 24 are copies of an executed file of a program downloaded in these nodes. 25 is offset made from the beginning of an executed file for called procedure. 26 is procedure call instruction called RCALL for convenience; 27 is instruction return from procedure. Identification of a procedure in remote call under relative address in an executed file is mentioned as an example and is simple and multipurpose but not safety because it allows executing remote call of any code in an application. A possible variant is procedure address transformation into identifier (for example, unique procedure name) to transfer this address under remote call and then transform it back in a recipient node. As long as a copy of the same application is downloaded in both nodes, single-valued transformation can be easily executed, for example, with the help of special tables included into the application. This type of tables can comprise not only function identifier and address but also security parameters of a call of these procedures. Besides, it is possible to realize other variants; for example, dynamically created lists with a static pointer at the first element are used instead of tables. A method of instruction identification is not essential with regard to the present invention as it is known to have a single value at both remote call ends (due to interaction of copies of one application) and generally depends on used programming language and safety requirements.

The FIG. 3 shows algorithm of execution of one control flow for a distributed application in accordance with the claimed invention. Generally, one processor can simultaneously execute one or several control flows concerning one or more than one applications depending on architecture and requirements to the application. At that, instruction of remote control transfer can be executed with the help of the following methods:

1) Synchronous manner. A processor executing a remote call transforms into a state of control return waiting.

2) Asynchronous manner. A processor executing a remote call does not wait for control return and proceeds to execution of instruction which follows control transfer instruction in memory.

3) One instruction of remote control transfer actuates execution of the next instruction in set of processors. To identify processors it is possible to use group address or a list or an execution system. At that every processor can get the same copy of procedure call parameters. Alternatively, every processor gets its own subset of call parameters, for example, if initial instruction denotes array, or value range, or collection as its parameters.

4) New distributed flows can be created with the help of API of execution system or resulting from remote calls mentioned in items 2) and 3).

The present list of methods can be continued without change of invention logic, and it is not necessary that examined control transfer instructions are supported on the level of compiler or interpreter. When analyzing a usual local call of procedure, compiler creates a special processor code, which records return address and call parameters in stack, and a processor code, which receives return result. When analyzing a typical remote procedure call (based on exchange of messages), proxy/stub code divided between a client and a server is created independently on the basis of some interface specification. In the claimed invention it is proposed to create both proxy/stub code and a code of local procedure call simultaneously, and include a code necessary for remote call into an executed file. Considering the fact that one executed file is realized in all nodes, it turns out that remote calls are completely consistent on a binary level, and proxy/stub code can be considered as extension of a typical local procedure call. At that, registration (either static or dynamic) of remote call procedure in execution system is not obligatory. Before procedure is called, it is checked whether remote or local call should be executed and then call of corresponding code, which records parameters in stack and carries out a local call or calls stub code, is made. Stub forms buffer with parameters of procedure call and interacts with execution system for remote call realization. Some programming languages, for example, C++ allow hiding such kind of check on the level of source text and developing a distributed application as a usual undistributed application. Thus usual compilers, builders and loaders can be used for program development. At that, operational system or execution environment must be extended by interaction module having mentioned functions of interaction between processors and being requested by proxy/stub code.

Abovementioned instruction of distributed control transfer allows of creating an efficient application in which data exchange is made by means of parameters of procedure calls. Nevertheless, to develop a full-scale application it is necessary to have access to data in static memory (global variables) and dynamical memory (heap). There are a lot of variants some of which are described further:

1) Heap which is common for all processors can be executed as a separate memory module with direct access given for any processor. It is rather good solution for a multiprocessor system. However this method can lead to additional traffic during interaction through network.

2) Usually compiler places global variables in an executed file of a program. Alternatively it is possible either to refuse usage of global variables changed after initialization, or to replicate changes, which have been executed in one memory module, onto other modules. At that, replication can be made as transaction. This method is appropriate when data are changed seldom.

3) Use of distributed memory with base-displacement addressing described in the FIG. 4. Here 40, 41, 42 is a temporary diagram of distributed control flow executed in three processors. Each processor assigns some segment of memory (43, 44, 45). When control is transferred to the next processor, memory block of a current processor is fixed (43, 44) and summary size of assigned blocks is transferred to the next processor by means of a call. When control is returned in distributed call chain, memory blocks are deallocated. Memory address 48 is computed as offset from the beginning of the first block. When a processor requests a memory which is not located in its memory module (49 instruction recording 0, value into an offset cell ([46]+[47])), the request is transmitted backward along distributed call chain until a necessary memory block is found. Distributed base-displacement addressing enables to address variables placed in local stacks and transfer addresses of these variables in parameters of remote calls. Generally, it is not obligatory that distinguished memory blocks are frames of local stack.

4) Use of distributed direct addressing proposed in "Unified Memory Space Protocol Specification", A. Bogdanov, RFC 3018, December 2000, item 2.1, pages 5-7. When this addressing is used, memory identifier includes network node address and local memory address. This structure enables to address memory cells in any node of network from other node. In the context of an application, this type of memory may be considered as common, and pointers may be exchanged between nodes freely.

Generally, a chosen method of memory control is not essential for the claimed invention and depends on tasks to be solved by an application.

In all cases capability of remote data addressing enables to put pointers on parameters of remote procedure calls. Owing to this characteristic it is possible to exchange object pointers and request object methods as long as the only considerable difference between procedure call and object method call is that there is one additional parameter, namely, an object pointer in a call (it is usually implicit on the level of source code of a method). Thus, it is enough when instruction of remote object method call has an object pointer pointing explicitly or implicitly at a processor, which stores this object, and identifier or address of an object method for a call.

A method of application download is not crucial for the claimed invention. The fact that instruction to be executed in the current moment is located in a memory is essential. Possible variants of application download are the following:

1) When static multi-processor systems are operated, application can be downloaded in all nodes in advance with possibility to use ROM. Preliminary download can be used for system programs which are downloaded once in a memory and, as a rule, not unloaded.

2) Usually user application is downloaded in one of network nodes, and distributed execution happens in favor of this node. In this case, firstly, an application is downloaded in initiation node; and download is performed dynamically in other nodes, if it is necessary to execute remote call in this node. When application operation is complete in an initiation node, it is unloaded form a memory in other nodes. An optional variant of centralized control of a distributed application is described in "Unified Memory Space Protocol Specification", A. Bogdanov, Internet-Draft, draft-bogdanov-umsp-rfc3018-update-00.txt, August 2003, expires February 2004, item 4.5, pages 9-10.

3) An application can be downloaded in several nodes independently and, if necessary, it is downloaded in other nodes dynamically. In this case distributed execution of an application completes when execution was complete in nodes where an application had been downloaded independently.

4) An application located in a specific processor can be unloaded explicitly by means of special instruction execution.

5) Provided an application is loaded in a processor independently of other processors, it can be completed when all computing flows of the application came to an end in this processor.

6) Provided an application located in a processor is loaded upon an initiative of another processor, it can be unloaded if does not executes any distributed control flow. Additionally, an application and an execution system can carry out counting of resources exploited by the application in this processor and unload the application if all resources are deallocated.

7) If a node provides applications initiated in other nodes with its computational or other resources, it can keep a record of resources exploitation in order to get payment or to restrict exploitation of these resources.

8) When an application is loaded in every node, a processor can execute a code of initialization of this application.

For this invention it is not important to know the place from where an application is loaded. Generally, it is identified with the help of abovementioned requirements to download and typology of specific system.

Here the following variants are possible:

1) An application loads a processor initiating application run in a memory from its local source. As for other processors, load is performed with use of a copy downloaded in memory module of a processor which executes remote call instruction (the application has been already loaded to its memory). Thus, an application is distributed in all necessary nodes.

2) Application can be loaded from one or several public sources, for example, from network folders or through URL. At that, execution modules exchange information of application location.

3) Execution modules can exchange information, which enables to identify an application copy (for example, digital signings of executed files), and transfer security context of application execution.

Download of a monolithic application in all nodes of a distributed system is shown in the FIG. 2. It is simple but nonoptimal solution form viewpoint of expending of memory and network traffic. The solutions enabling to minimize these shortages are following:

1) Virtual memory. Memory is allocated for an application in all nodes but download of separate segments of an executed file is performed on demand.

2) Allocation of a code for distributed execution into separate modules, for example, DLL or Java class. DLL code can execute distributed calls of its functions. A code of an application loading this DLL can execute local calls of functions of loaded DLL. If different or equal applications loaded one distributed DLL in different processors, copies of this DLL can interact in such a manner as described in the claimed invention. This DLL can be loaded dynamically. To perform this operation, remote procedure call should comprise information of an executed file to be loaded. At that, it is possible to use several corresponding DLL. They can be loaded by an application both dynamically and statically. Generally, only DLL obtaining control must be downloaded to execute a remote call in a node obtaining control. Though distributed DLL can perform a remote call of only its own functions, it does not mean that distributed interaction is limited within logic of this DLL. An application can register return call function addresses, which to obtain control as result of return calls, in DLL and provide with data transferred by DLL functions to remote nodes.

Thus, the claimed technical result is achieved by means of:

1) A distributed application can operate both in one and many nodes and change configuration dynamically as long as it is developed as usual undistributed application. Instructions of distributed control transfer can transfer control both locally and remotely, and an application can be loaded and unloaded dynamically in different processors.

2) Distributed applications can have complex and varied logic of interaction between elements executed in different nodes as long as it is provided by concerned instruction of remote control transfer and application copy download in all nodes. In this case, protocol of interaction on application level does not exist. It is not necessary either to adjust a format of messages or to determine acceptable sequence of procedure calls and acceptable global application state. One application operates in a set of nodes. Any function located in any node can be called from any node and any place of a code according to the sequence which is demanded for task solution (if this operation does not contradict security requirements and functional division of nodes).

3) Global state of an application can be simple as long as an application is developed as usual undistributed application and has restricted and specified number of state variables.

4) To develop applications it is possible to use standard compilers and builders because the only essential difference of application development under the claimed invention is one additional parameter in procedure calls, namely, a processor pointer which can be explicitly indicated in a source text of a program or computed. As for the rest, logic of distributed application development does not differ from logic of undistributed application development. To execute distributed application it is possible to use standard loaders of execution system as long as proxy/stub code, which is necessary to support of remote calls in equipment or execution environment failing to support these calls explicitly, can be built into application code.

DETAILED DESCRIPTION OF THE INVENTION

The considered invention realization is designed for Windows operational system and processors which do not explicitly support the concerned architecture on hardware level. Internet network nodes are separate execution modules. Realization of abovementioned experimental UMSP Internet-protocol realized under the character of Windows service is used as execution module interaction means. Its general functions are control of start and completion of distributed application execution as well as creation of dynamical common distributed memory which is available within limits of a separate distributed application. Besides, protocol provides with transport level for execution of remote procedure calls.

Distributed application is usual execution Windows exe-file created with the help of a standard compiler C++. Special library of patterns C++ um.h is used during compilation.

Logic of considered control transfer instruction is realized on the level of compiler and system services of operational system. At the same time it is fair to say that proposed simple program realization can be used on other platforms, on the level of processor microprograms and on the hardware level. Lower level of realization is preferable when considered architecture is used in multi-processor or multi-core systems and when system software is executed. In these cases UMSP protocol can be substituted for inter-processor communication means or other special means.

Figure 1:
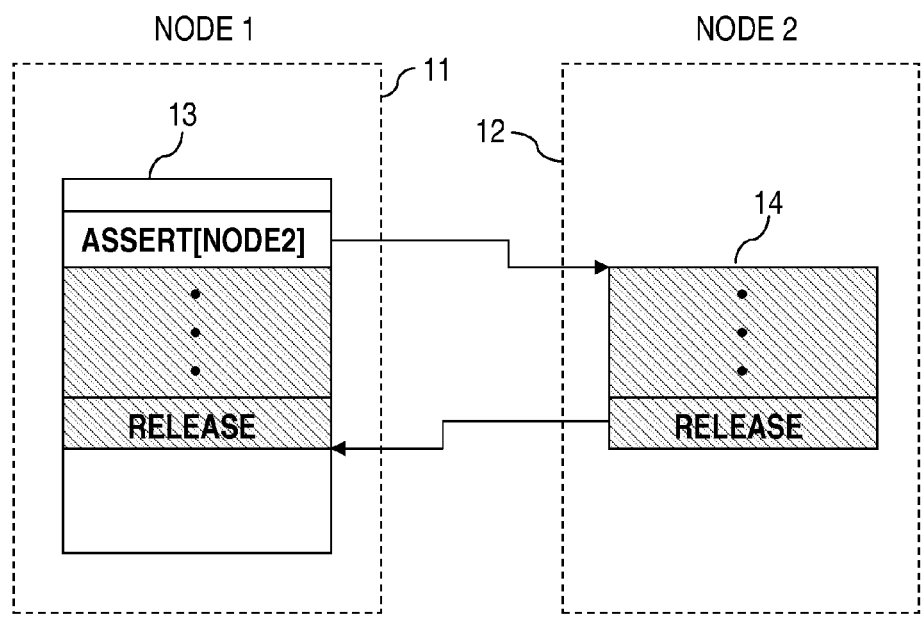
FIG. 1. It shows utilization diagram of a prototype of the claimed invention.
Figure 2:
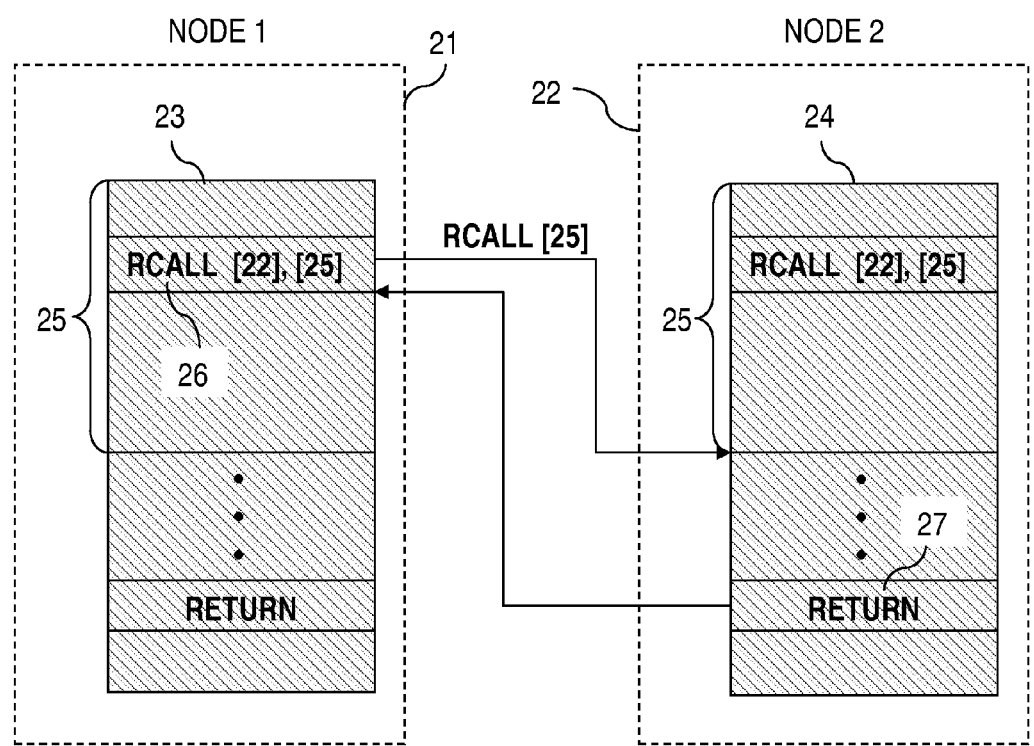
FIG. 2. It shows utilization of the claimed invention with the help of a sample of a program comprising one file.
Figure 3:
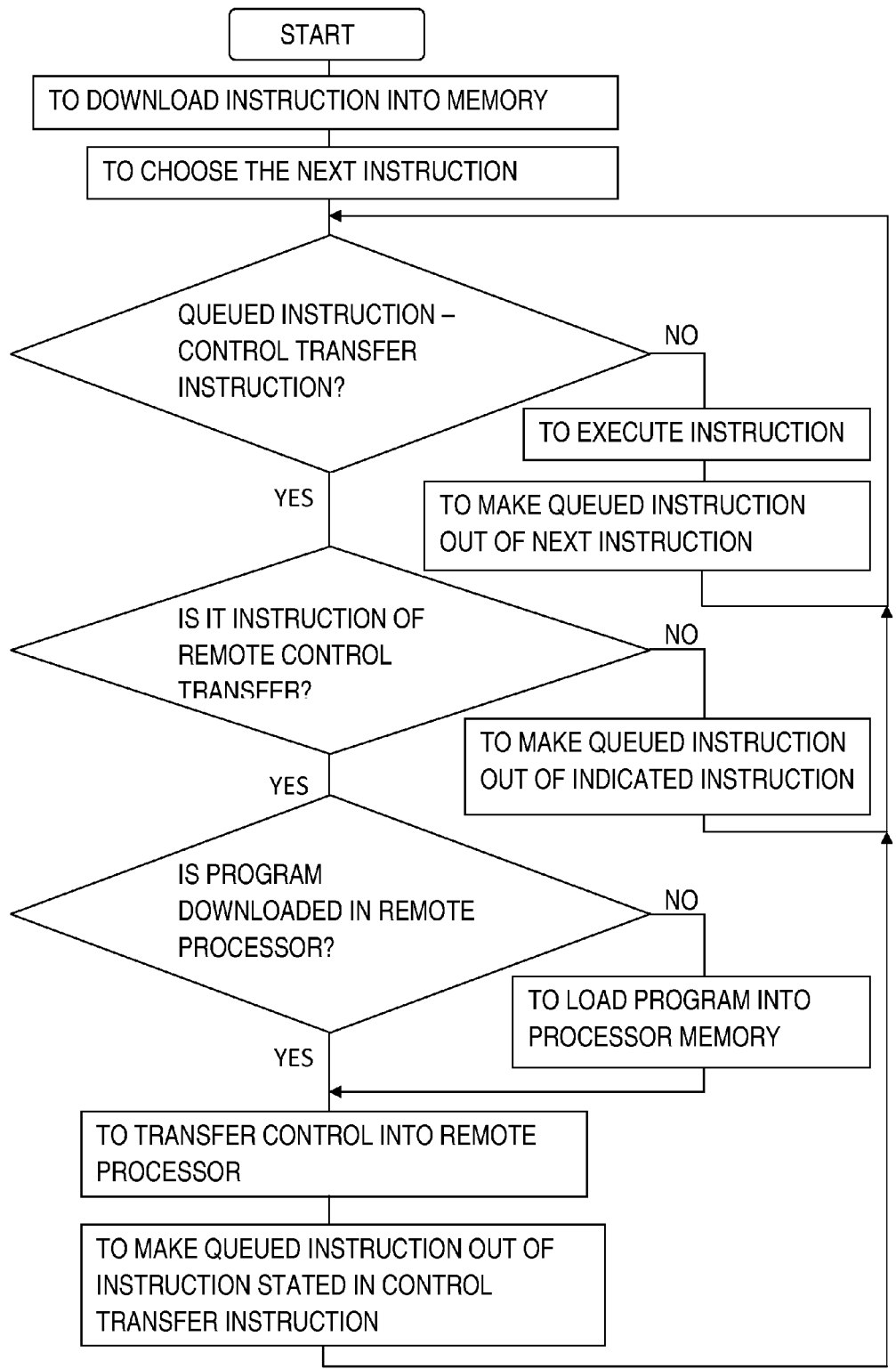
FIG. 3. It shows computing algorithm of the next instruction under program realization.
Figure 4:
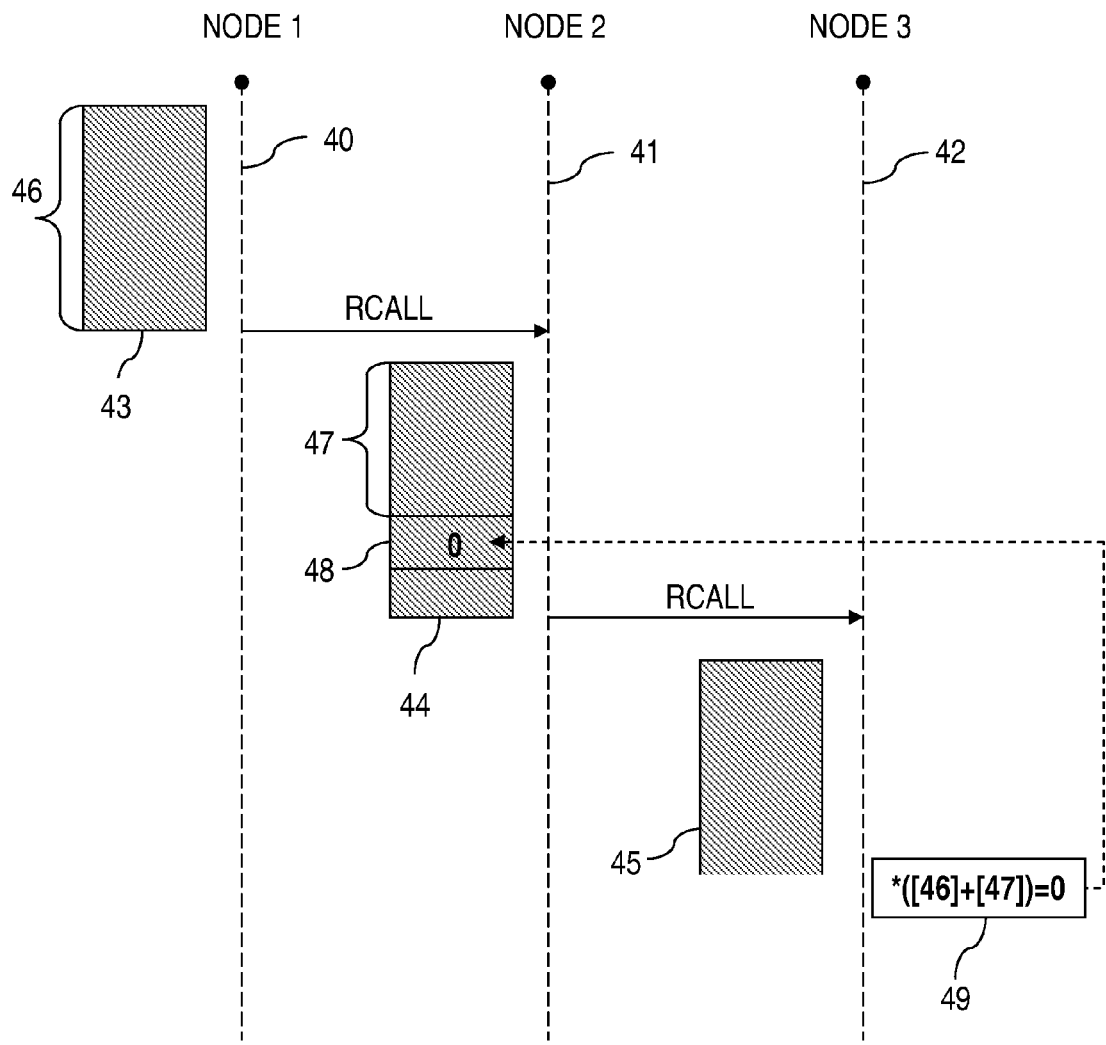
FIG. 4. It shows utilization of a distributed memory with base-displacement addressing.

In order to describe distributed system operation there is an example of source text of minimal distributed application "Hello, World!" in C++. The present example has much in common with FIG. 2:

```
1 #include "um.h"
2 void functHello(const char* s_out) {
3     printf(s_out);
4 }
5 void main( ) {
6     UM_ADD_FUN(functHello);
```

```
7    InitJob( );
8    rcall("10.0.1.28", functHello, "Hello, World!");
9 }
```

It differs from usual minimal program by presence of three additional lines 1, 6, and 7.

Line 1, includes library um.h, which realizes a set of patterns necessary for distributed application creation.

Line 6, shows UM_ADD_FUN command which declares that functHello function is available for remote call. Generally this line may be absent as long as the claimed invention enables to operate function addresses without preliminary declaration directly in remote mode. However remote call of instruction in a program is not available in distributed network for security reasons (nevertheless this function is possible in closed confidential systems, for example, in multiprocessor systems). Function address is connected to its symbolic presentation formed under some algorithm during the process of registration in considered invention realization. Achieved connection is stored in application memory. Further symbolic presentation is used in network primitives of remote call, and backward transformation happens when a function is executed. As long as a copy of the same application is used in all nodes, such transformations are performed uniquely (on binary level) without preliminary protocol consistency and without registration of functions in an execution system.

InitJob( ) command registers the present sample of run application in UMSP in line 7. This line is specific feature of considered invention realization. It may be absent in general case (for example, when concerned technology is supported on the level of standard loader which knows that the current application is distributed). All nodes executing distributed application are divided into application initiation node and other nodes within the context of the considered realization. It is typical case when a user initiates application run in initiation node. Distributed execution proceeds until application comes to an end in initiation node. InitJob( ) command realizes this logic. This command returns control into the program in initiation node after necessary initialization was executed. InitJob( ) command never returns control in other nodes. At that an application can perform incoming requests of remote procedure call. Application completes in initiation node in a usual manner (for example, through main ( ) function completion). InitJob( ) instruction code waits for corresponding command to be received from UMSP in other nodes.

Remote procedure call is executed in line 8. And rcall pattern is control transfer instruction realization in the concerned invention. This pattern provides a compiler with instructions for creation of a remote call code. Realization of the pattern is based on a standard C++ procedure of recursive call of a template function. The result is a code adjusting execution of the concerned control transfer instruction to be operated in processors which do not support this kind of instructions explicitly (proxy/stub code). The adjusting code fulfills the following functions:

1) packs parameters of a procedure cal and requests UMSP functions for execution of a remote call, 2) unpacks parameters on the receiving side and performs a call of the corresponding procedure, 3) if necessary, packs and unpacks results in a source node when control is returned.

As long as a copy of one application is used in all nodes, we get completely consistent remote call code on the binary level. This code does not require interaction protocol and registration in an execution system. The adjusting code is included into executed application file by a compiler and has the same functions as a code of a usual procedure call (for example, stdcall) has. The adjusting code is just add-on.

The first parameter of rcall pattern in the described example is network node address which is used to perform a function (indicated network address is given as an example). The second parameter is a function to be executed. The third parameter is a parameter of this function. The result of remote call execution is the following:

1) Executed file copy download in 10.0.1.28, node. There are different methods of download. The simple method is that a file is placed into a network folder, and its URL is transferred through UMSP. Another method which does not require any operations during application decompression is that a file is replicated by means of UMSP protocol as a consequence of remote call performance. Other variants including abovementioned variants can be used.

2) When an executed file is downloaded, code of main( ) function is fulfilled before InitJob( ) command runs.

3) Then incoming remote call of functHello( ) function is performed, and an application is waiting for the next remote call in this node.

After control returns into initiation node, an application completes its operation in initiation node (for the concerned example of a program). At the same time UMSP completes application operation process in 10.0.1.28, node.

When analyzing the mentioned example of a program it is necessary to note that undistributed application turns into distributed application by means of addition of just three declarative lines which do not complicate logic of the application. At that, additional operations are not required. Existing technology level does not offer such simplicity of development.

Library um.h supports not only calls of static functions in C language but also remote creation of objects and remote call of their methods. A modified example of the simplest program is described hereinafter.

```
1  #include "um.h"
2  class myObj {
3      void functHello(const char* s_out) {
4          printf(s_out);
5      }
6      static uptr<myObj> make( ) {
7          return umake<myObj>( );
9      }
10 }
11 void main( ) {
12     UM_ADD_FUN(myObj::make);
13     UM_ADD_FUN(myObj::functHello);
14     InitJob( );
15     uptr<myObj> ptr = rcall("10.0.1.28", myObj::make);
16     ptr.rcall(functHello, "Hello, World!");
17     destroy(ptr);
18 }
```

Let us consider lines which distinguish this code from the previous example.

Line 2, comprises usual declaration of myObj class. The example shows remote call of a method of this class.

There is a static generating function in 6-9, lines. This function returns uptr<> structure which is a special distributed pointer at an object. The pointer comprises not only object address in a local memory but also network node address where object instance is placed. Such distributed pointers can be freely transferred in parameters and returned values of remote function calls. Pattern umake<> (in 7, line)

fulfills functions of standard new operator for distributed objects. This pattern creates an instance of myObj object in a local memory of a node together with a special shell object. Distributed uptr< > pointer comprises address of a shell object. A shell object enables to perform remote calls of methods of an object.

When line 15, in 10.0.1.28, node is realized, an instance of myObj object is created, and its pointer is assigned by ptr variable. When an object is created, remote call of static generating myObj::make( ) function is performed (remote call of static functions is described in details in the previous example).

A call of functHello method with "Hello, World!" for an object, at which ptr variable points, is executed in line 16. When a call is executed, rcall pattern of remote call of object method is used. When remote call of object method is realized, execution sequence is similar to static function call execution sequence. The specific feature is an implicit additional parameter of a call, namely, a distributed pointer at an object (similar to classical local calls of object methods).

Deletion of an object and deallocation of memory where it was placed in its node is carried out in line 17, (similar to standard delete operator). Result of execution of this line is remote call of a special static function realized in um.h.

In all cases, when network node address, where the call is executed, is used to call a function or a method of an object, usual local call is performed instead of remote call. Thus, an application can be executed either in one node or in a set of nodes and choose between a local call and a remote function call judging from current possibilities or necessity.

The concerned invention realization uses standard development means and is performed in execution system of general purpose. It enables to use the present invention realization in a wide range. When specific compilers, builders and execution environment (whatever combination) are used, functionality of this realization can be extended. One of possible variants is compilation of a procedure into a code for processors with various instruction systems. A code of a central processor and a specific processor (for example, a code of graphic accelerator or input-output control unit) can be used. In general case, procedure code can be created for some types of system processors, or stub code can be created for separate processors (for example, stub rejecting exclusion or returning error). A special builder can collect several variants of a procedure code into a special executed file. When procedure call is executed, a type of a processor, to which control can be (or should be) transferred, is computed. It is possible to choose not only a type of a processor, but also a network node. There are other variants of upgrade of the concerned invention realization.

In spite of seeming simplicity of the proposed examples of programs, they are full-scale distributed applications which can be adjusted to systems of any level of complexity. It is fair to say that the concerned invention realization confirms the claimed technical result. Firstly, it concerns development simplicity, as long as it enables to operate usual undistributed primitives and create distributed applications being as simple undistributed applications. Secondly, it concerns a predictable global state. Actually, the claimed invention is transfer of a classical computing model with stack and dynamical memory into distributed environment. Provided that nodes of a system are absolutely reliable (or fail to function/shut down simultaneously), a state of a distributed application may be completely predictable. Also it concerns its local analogue.

As long as complexity of development is the main factor limiting functionality of distributed applications on a certain technical level, the claimed invention enables to solve this problem considerably.

The invention claimed is:

1. A method of distributed computing in a distributed system comprising of one or more interacting execution modules, one or more memory modules connected to said execution modules and containing execution module instructions, in which said execution modules support instructions of a remote control transfer with return, characterized in that for memory addressing it is necessary to use distributed memory with base-displacement addressing for which:
   a memory block is allocated when control under a control transfer instruction is obtained or when a first instruction in a memory module of said execution module is performed,
   said memory block is deallocated when control in a distributed stack of calls is returned, when remotely transferring control from one execution module to another execution module, a size of said memory block is fixed, and a current size relating to said distributed memory being a sum of sizes of all allocated blocks in said distributed stack of calls is transferred,
   a relative address in said distributed memory is computed from the beginning of a first block at a collection of blocks in said stack of distributed calls and is considered as continuous memory,
   when executing instructions that use said distributed base-displacement addressing, an execution module controls overrun of its memory block,
   when an execution module detects an overrun of its memory block, it requests data of a previous execution module in said stack of distributed calls,
   the previous execution module either returns data if the data are stored in its memory block or passes a request to its previous execution module in said stack of distributed calls and then returns data which are received from the previous module.

2. The method according to claim 1, characterized in that the said instruction of said remote control transfer with a return is an instruction of a remote procedure call.

3. The method according to claim 1, characterized in that a stack frame of a current distributed call is used as a block allocated for memory with said distributed base-displacement addressing.

* * * * *